(12) United States Patent
Liu

(10) Patent No.: US 11,873,665 B2
(45) Date of Patent: Jan. 16, 2024

(54) BIKE LOCK

(71) Applicant: TEAM YOUNG TECHNOLOGY CO., LTD., Taoyuan (TW)

(72) Inventor: Chih-Hung Liu, Taoyuan (TW)

(73) Assignee: TEAM YOUNG TECHNOLOGY CO., LTD., Taoyuan (TW)

( * ) Notice: Subject to any disclaimer, the term of this patent is extended or adjusted under 35 U.S.C. 154(b) by 356 days.

(21) Appl. No.: 17/458,592

(22) Filed: Aug. 27, 2021

(65) Prior Publication Data

US 2022/0063744 A1 Mar. 3, 2022

(30) Foreign Application Priority Data

Sep. 2, 2020 (TW) .................. 109130101

(51) Int. Cl.
*B62H 5/06* (2006.01)
*E05B 71/00* (2006.01)

(52) U.S. Cl.
CPC ............... *E05B 71/00* (2013.01); *B62H 5/06* (2013.01)

(58) Field of Classification Search
CPC ........... E05B 71/00; B62H 5/003; B62H 5/02; B62H 5/06
See application file for complete search history.

(56) References Cited

U.S. PATENT DOCUMENTS

| | | | | |
|---|---|---|---|---|
| 2,032,821 A * | 3/1936 | Waits | ....................... | B62H 5/06 70/185 |
| 4,028,916 A * | 6/1977 | Pender | .................. | E05B 67/003 70/49 |
| 4,055,060 A * | 10/1977 | Bellino | ..................... | B62H 5/06 70/238 |
| 4,232,537 A * | 11/1980 | Plaiss | ....................... | B62H 5/06 70/238 |
| 6,076,381 A * | 6/2000 | Green | ...................... | B62H 5/06 70/186 |
| 8,132,437 B1 * | 3/2012 | Chen | ...................... | B62H 5/003 70/30 |
| 9,976,321 B2 * | 5/2018 | Chen | ...................... | B62H 5/003 |
| 10,538,285 B2 * | 1/2020 | Mori | ....................... | E05B 71/00 |
| 10,759,382 B2 * | 9/2020 | Huang | ..................... | B62H 5/06 |
| 11,738,816 B2 * | 8/2023 | Liu | ......................... | E05B 71/00 70/174 |
| 2018/0244329 A1 * | 8/2018 | Mori | ....................... | B62H 5/06 |

FOREIGN PATENT DOCUMENTS

| | | |
|---|---|---|
| CN | 205022738 | 2/2016 |
| CN | 206187244 | 5/2017 |
| JP | 2000008674 | 1/2000 |
| TW | 397000 | 7/2000 |

* cited by examiner

*Primary Examiner* — Christopher J Boswell
(74) *Attorney, Agent, or Firm* — JCIPRNET

(57) ABSTRACT

The disclosure discloses a bike lock used to lock the bike to prevent bike theft. A first shaft and a second shaft of the bike lock are connected to the handlebar and the front wheel of the bike, respectively. When the bike lock is in a locking mode, the first shaft is not linked to move with the second shaft, preventing the user from controlling the front wheel by the handle effectively. When the bike lock is in an unlocking mode, the first shaft is linked to move with the second shaft. The first shaft can be linked to move with the second shaft by two different linkage mechanisms. One is to link the first shaft with the second shaft with a pin; the other is to firmly engage an engaging structure of one of the shafts to another.

10 Claims, 14 Drawing Sheets

BIKE LOCK

CROSS-REFERENCE TO RELATED APPLICATION

This application claims the priority benefit of Taiwan application serial no. 109130101, filed on Sep. 2, 2020. The entirety of the above-mentioned patent application is hereby incorporated by reference herein and made a part of this specification.

BACKGROUND

Technology Field

The disclosure relates to a bike lock, especially a bike lock with multiple protection mechanisms.

Description of Related Art

To solve the storage problem of traditional bike locks such as D-locks, integrated locks that securely lock the bike lock to the body of the bike have emerged in the market. Moreover, concealed locks that store the locks inside the frame or the front fork tube have also emerged. The user can turn the exposed lock cylinder with a key or the like to drive the pin to lock and unlock.

However, currently most concealed locks are designed to prevent the rotation of the front fork tube or that of the stem by using a pin that penetrates both the front fork tube and the head tube at the same time when locking. However, in these concealed locks, concentric holes have to be disposed to the head tube and the front fork tube for the pin to penetrate. Moreover, there are also other similar types of locks, which drive the toothed element disposed between the head tube and the front fork tube by inserting a pin through the front fork tube, and the linkage mode of the head tube and the front fork tube is controlled by using the connection and disconnection state. Nevertheless, each of the designs must be commissioned by the refitting industry to carry out destructive modifications such as welding, drilling, and the like, which is not only difficult but expensive in terms of installation. Also, once undergone the destructive modifications, the structural strength of the bike and the price of the bike in the second-hand market may be adversely affected.

Based on the above, in the known design of bike locks, the pins penetrating both the front fork tube and the head tube or the toothed elements between the head tube and the front fork tube are used to block the rotation of the front fork tube or the rotation of the stem relative to the head tube to achieve the locking effect. All of them require customized or destructive modifications of the front fork tube or head tube of the bike to install, and the installation process is complicated, which makes it difficult to promote these bike locks in the parts market (also known as aftermarket).

SUMMARY

In view of the disadvantages of the prior art, one of the objectives of the disclosure is to provide a bike lock. Taking one of the possible designs as an example, the bike lock includes a first shaft and a second shaft. The first shaft is connected to the handlebar through the stem, the second shaft can be elongated and fixed in the front fork tube, the linkage state of the handlebar and the front wheel is controlled by controlling the linkage state of the first shaft and the second shaft, so that the handlebar cannot effectively control the steering of the front wheel when it is locked, and the purpose of anti-bike theft is achieved. When the bike lock is unlocked, the first shaft and the second shaft are linked by the pin. When the bike lock is locked, the pin comes off from any one of the first shaft and the second shaft so that the first shaft and the second shaft are not linked. To ensure that the pin can be smoothly inserted into the first connecting hole of the first shaft and the second connecting hole of the second shaft, clearance fit is adopted for the pin and the first shaft and the second shaft respectively, that is, the first connecting hole and the second connecting hole are respectively slightly greater than the pin.

However, due to the clearance fit design of the pin, the first shaft, and the second shaft, there may be a gap between the elements, that is, when the user turns the bike handlebar in the unlocking mode of the bike lock, the pin may not be able to tightly link the first shaft and the second shaft. On the contrary, each of the elements may sway. For this reason, in addition to the linkage mechanism, in one of the possible designs of the disclosure, a corresponding engaging structure is further disposed on the connecting end surfaces of the first shaft and the second shaft respectively to tightly engage the two shafts. The second linkage mechanism is used as an assistance to solve the problem.

One category of the disclosure relates to a bike lock including a first shaft, a second shaft, and a pin. The first shaft includes a first connecting hole and a first engaging structure, and the first shaft is adapted to link to an element of the bike. The second shaft includes a second connecting hole and a second engaging structure, and the second shaft is adapted to link to another element of the bike. The pin is adapted to limit actions of the first shaft and the second shaft. The bike lock includes a locking mode and an unlocking mode, and in the unlocking mode, the first shaft is linked to the second shaft by a first linkage mechanism or a second linkage mechanism. In the first linkage mechanism, the pin is inserted into the first connecting hole of the first shaft and the second connecting hole of the second shaft, so the first shaft and the second shaft are linked to each other, and clearance fit is adopted for the first connecting hole and the second connecting hole with the pin, respectively. The second linkage mechanism engages the first engaging structure of the first shaft with the second engaging structure of the second shaft, so the first shaft and the second shaft are linked to each other, and the first engaging structure is closely fit with the second engaging structure.

In any one as the bike lock, the bike lock further includes a driving component linked to the pin, and the driving component is adapted to drive the pin to be inserted into the first shaft and the second shaft when the bike lock is switched from the locking mode to the unlocking mode.

In any one as the bike lock, the first shaft includes an upper vertical through hole and a lower vertical through hole, the upper vertical through hole and the lower vertical through hole are disposed coaxially, an aperture of the lower vertical through hole is greater than an aperture of the upper vertical through hole, a first annular platform is disposed at a junction between the lower vertical through hole and the upper vertical through hole of the first shaft, the first engaging structure is located on the first annular platform, a top side of the second shaft includes an upper annular end surface, and the second engaging structure is located on the upper annular end surface.

In any one as the bike lock, the first engaging structure is a groove-shaped cavity extending toward an axis of the first shaft, the second engaging structure is a protrusion extending toward an axis of the second shaft, and the protrusion includes an inclined surface or a curved surface.

In any one as the bike lock, the groove-shaped cavity is disposed on the first annular platform, the groove-shaped cavity is a circular curved surface structure, the protrusion is disposed on the upper annular end surface, and the protrusion is a circular curved structure or a trapezoidal structure with a narrow top and a wide bottom.

In any one as the bike lock, when the bike lock is in the unlocking mode, relative to the first shaft, the second shaft rotates axially along the axis of the second shaft and moves in a vertical direction within a limited range.

In any one as the bike lock, a maximum amplitude of the axial rotation in the unlocking mode is less than the half width of the second engaging structure, so the first shaft and the second shaft are automatically aligned and engaged along the inclined surface or the curved surface of the second engaging structure.

In any one as the bike lock, when the bike lock is in the locking mode, a maximum relative displacement of the first shaft and the second shaft in the vertical direction is greater than a height of the protrusion of the second engaging structure, so the first shaft freely rotates axially relative to the second shaft.

In any one as the bike lock, the bike lock further includes a base. The base is fixed in a housing, and the base is adapted to fix the first shaft and the housing to each other and limit a maximum relative displacement of the second shaft relative to the first shaft in the vertical direction.

In any one as the bike lock, the bike lock further includes a housing for accommodating at least a part of the first shaft, the second shaft, and the pin, respectively. When the bike lock is in the unlocking mode, one of the first shaft and the second shaft is fixed to the housing, and the other is movable relative to the housing.

In order to make the aforementioned features and advantages of the disclosure comprehensible, embodiments accompanied with drawings are described in detail below.

DESCRIPTION OF THE EMBODIMENTS

The above description, other technical contents, features, and effects of the disclosure may be clearly illustrated in detail in a preferred embodiment below. The directional terms mentioned in the following embodiments, such as up, down, left, right, front, back, top, bottom, side, etc., are used to illustrate the relative relationship and design of each element and are not intended to limit the disclosure. The term "including one" in the disclosure means including at least one unless otherwise defined.

Figure 1A:
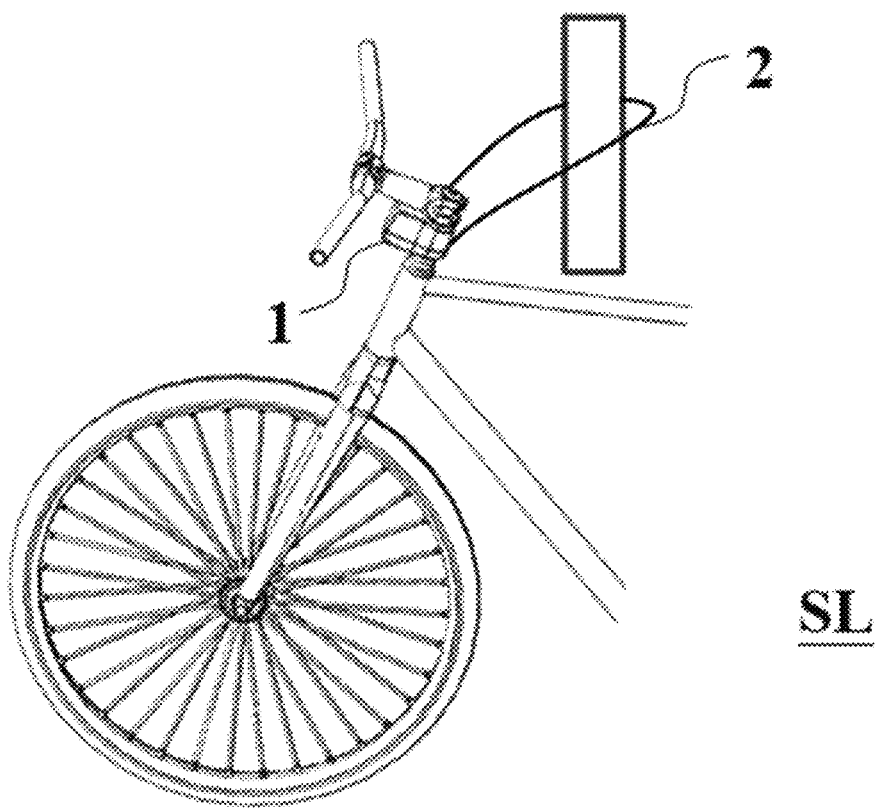
FIG. 1A and FIG. 1B are schematic views respectively illustrating an operational scenario in which a lock is applied to a bike and the outlook of the lock according to the first embodiment of the disclosure.
Figure 1B:
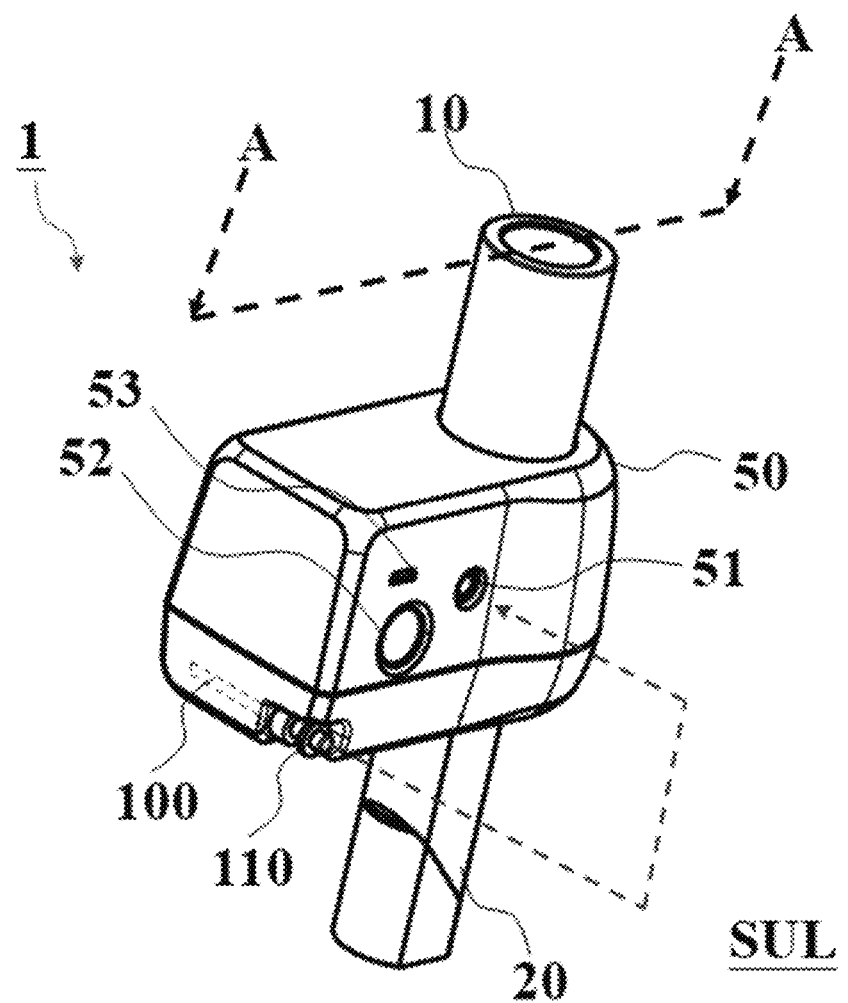

Referring to FIG. 1A and FIG. 1B, FIG. 1A and FIG. 1B are schematic views respectively illustrating an operational scenario in which a lock 1 is applied to a bike and the outlook of the lock 1 according to the first embodiment of the disclosure. From the outlook of the bike lock (hereinafter referred to as a lock 1), the lock 1 has a housing 50. A lock hole 51, a retraction button 52, a connection port 53, and a rope head 110 connected to a rope 100 are disposed on the housing 50. Moreover, a first shaft 10 and a second shaft 20 pass through the upper and lower sides of the housing 50. As shown in FIG. 1B, the first shaft 10 and the handlebar are fixed to each other by a stem and move along with one another; and the second shaft 20 can be elongated and fixed to the inside of the front fork tube and move along with one another.

The lock 1 includes two states: an unlocking mode SUL and a locking mode SL. In the locking mode SL, the first shaft 10 and the second shaft 20 are not effectively linked; in the unlocking mode, they are linked. When switching from the unlocking mode SUL to the locking mode SL, the process is called a locking process, and vice versa the process is called an unlocking process. At the beginning of the locking process, the user can pull the rope head 110 out of the housing 50, and the rope head 110 can be disposed separately or connected to the rope 100. In the design with the rope 100, the user can wrap the rope 100 around a fixed object 2 and then insert the rope head 110 into the lock 1 through the lock hole 51 to trigger the locking action of the lock 1. When the user pushes the rope head 110 to the locked position of the lock 1, the lock 1 is in the locking mode SL, and the rope head 110 is locked in the lock 1. Meanwhile, the first shaft 10 and the second shaft 20 may automatically switch to not be linked, and the handlebar and the front wheel of the bike are not effectively linked, so that the user cannot control the steering of the front wheel by turning handlebar, and thereby a preferred anti-theft effect is achieved.

When the user needs to unlock the bike, an unlocking device (not shown) can be used to be electrically connected to the connection port 53 of the lock 1 through a connecting wire. After being connected, the lock 1 may automatically recognize the unlocking device. After the successful recognition is implemented, the lock 1 may automatically unlock and return to the unlocking mode SUL. During the process, the rope head 110 may be automatically pushed out of the housing 50 and come off, the handlebar and the front wheel of the bike may automatically return to the linked state, and the user is allowed to resume a normal ride.

Subsequently, if the rope head 110 is connected to the rope 100, the user can press the retraction button 52, and the lock 1 may automatically retract the rope 100 into the housing 50. The unlocking device can be various electronic devices with power and signal transmission functions, such as a remote control, a mobile phone, or the like. In the embodiment, the unlocking device and the lock 1 are connected by a connecting wire, such as a charging cable. However, if required, a wireless module with both power and signal transmission functions can be used instead. The disclosure is not limited thereto.

The detailed design of the lock 1 in the disclosure is illustrated in the following paragraphs.

Figure 1C:
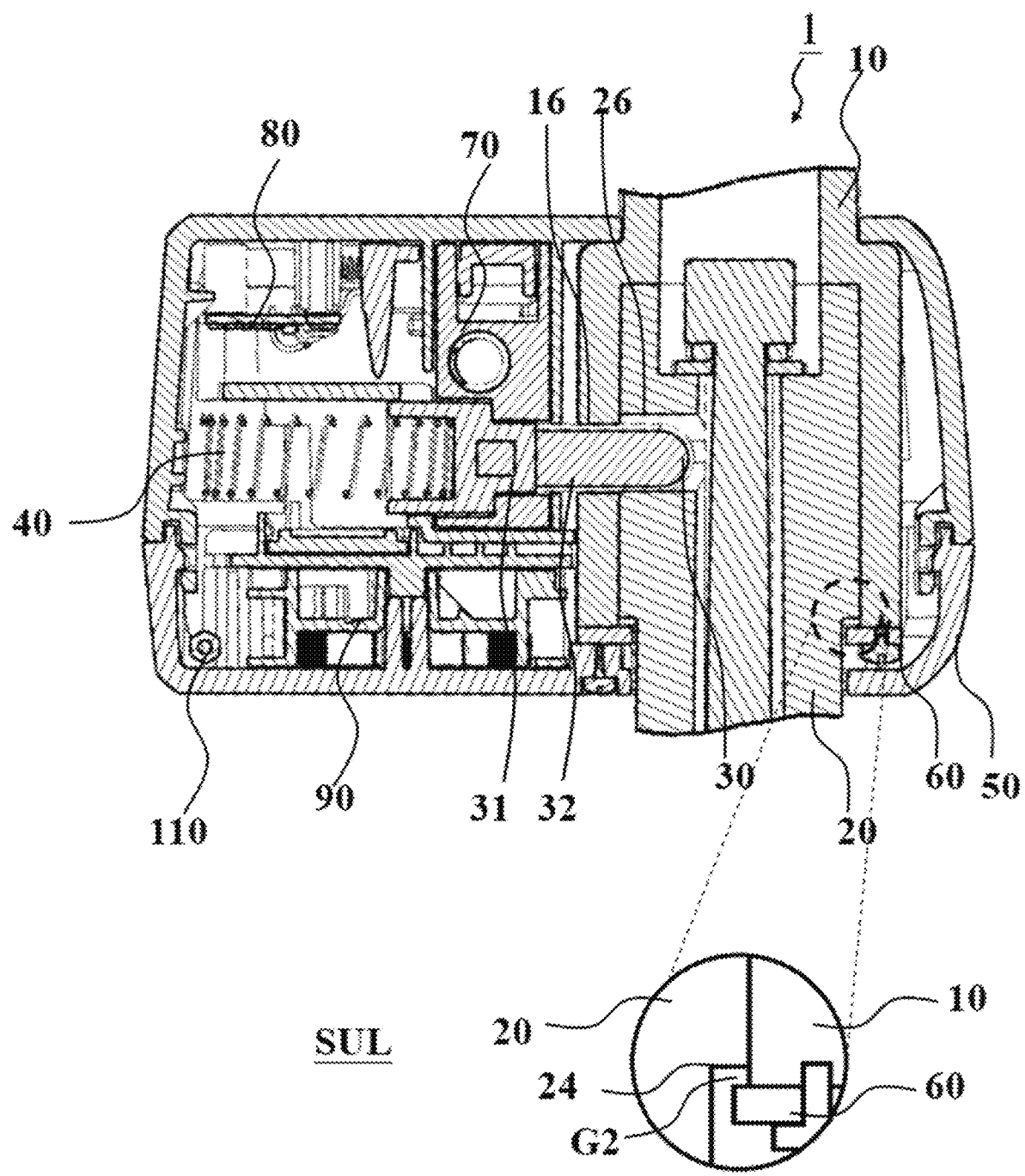
FIG. 1C is a schematic view illustrating a partial cross-section of the lock taken along the A-A reference line of FIG. 1B in an unlocking mode according to the first embodiment of the disclosure.

Referring to FIG. 1A to FIG. 1C altogether, FIG. 1C is a schematic cross-sectional view illustrating the lock 1 taken along the A-A reference line of FIG. 1B in the unlocking mode according to the first embodiment of the disclosure. According to the drawings, in the embodiment, the lock 1 mainly includes the first shaft 10, the second shaft 20, a pin 30, a driving component 40, the housing 50, a base 60, a slider 70, a control module 80, a lock rope turntable 90, the rope 100, and the rope head 110.

Before illustrating the relative relationship of each element, the design of each element is illustrated as follows.

Figure 2A:
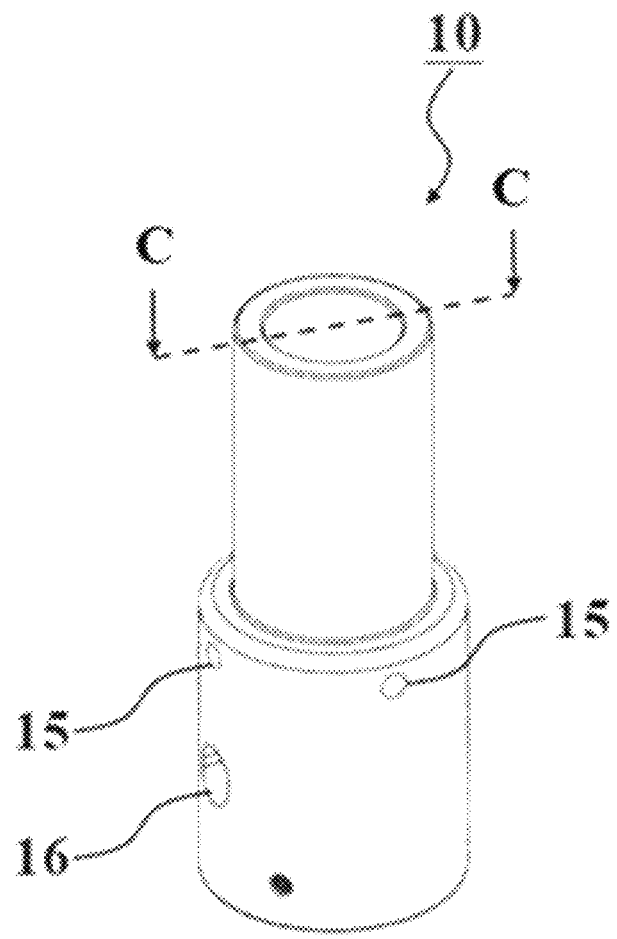
FIG. 2A is a three-dimensional schematic view of the first shaft of the lock.
Figure 2B:
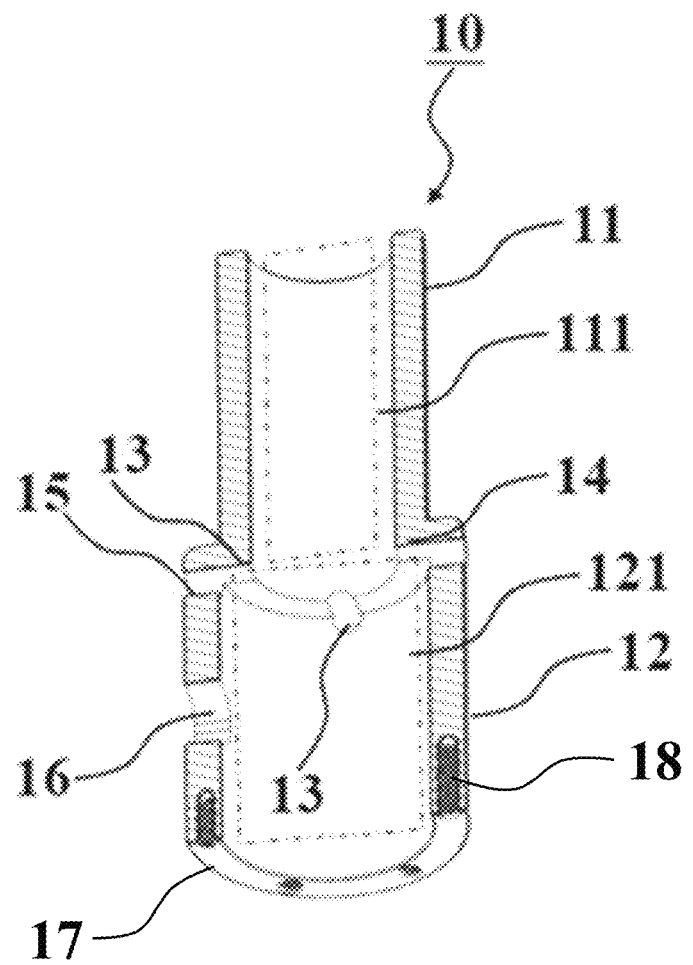
FIG. 2B is a schematic cross-sectional view of the first shaft of the lock taken along the C-C reference line according to the first embodiment of the disclosure.
Figure 4A:
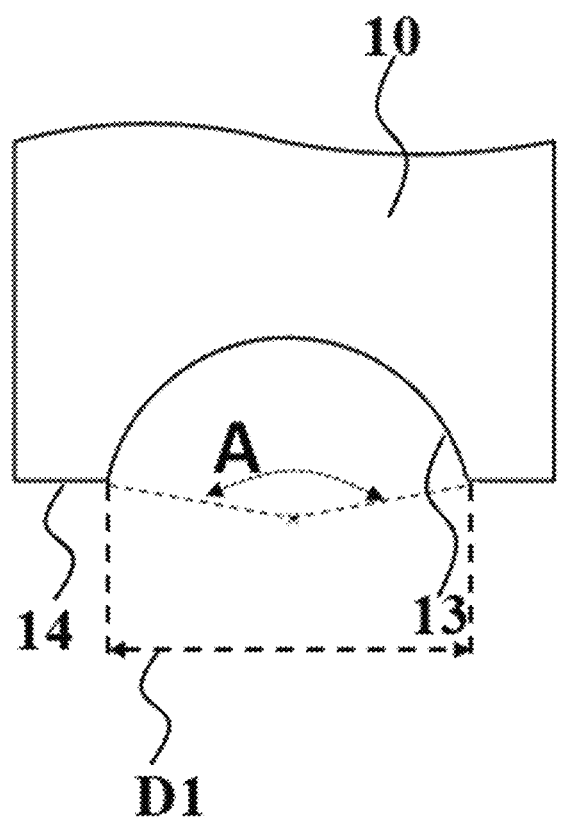
FIG. 4A, FIG. 4B, and FIG. 4C are schematic views of a first engaging structure, a second engaging structure, and their relative relationship of the lock, respectively according to the first embodiment of the disclosure.

Referring to FIG. 2A to FIG. 2B, FIG. 2A is a three-dimensional schematic view of the first shaft 10 of the lock 1 according to the first embodiment of the disclosure; FIG. 2B is a schematic cross-sectional view of the first shaft 10 of the lock 1 taken along the C-C reference line according to the first embodiment of the disclosure. In the embodiment, for example, the first shaft 10 may selectively include a metal material (e.g., aluminum) and may be a one piece formed structure formed by a cutting process. The first shaft 10 includes a first upper tube 11 and a first lower tube 12. The first upper tube 11 includes an upper vertical through hole 111, and the first lower tube 12 includes a lower vertical through hole 121, the upper vertical through hole 111 and the lower vertical through hole 121 are coaxial and communicate with each other. The aperture of the lower vertical through hole 121 is greater than the aperture of the upper vertical through hole 111 so that a first annular platform 14 is disposed at the junction between the upper vertical through hole 111 and the lower vertical through hole 121, and at least one first engaging structure 13 is disposed on the first annular platform 14. Referring to FIG. 4A, FIG. 4A is a schematic view illustrating the side profile of the first engaging structure of the lock 1 according to the first embodiment of the disclosure. In the embodiment, each of the first engaging structures 13 is disposed on the first annular platform 14 and extends from the outer edge of the first annular platform 14 to the axis of the first shaft 10. Each of the first engaging structures 13 is a groove-shaped cavity. In the embodiment, the first engaging structure 13 is a cylindrical groove with a semicircular cut surface profile. To dispose the first engaging structure 13, a drill can be selectively used to directly drill at least one lateral through hole 15 at the height of the first annular platform 14 of the first shaft 10, and each of the lateral through holes 15 penetrates the side wall of the first shaft 10 and removes part of the material on the first annular platform 14 to form the semicircular groove serving as the first engaging structure 13. Accordingly, processing precision is improved and costs are reduced.

As shown in FIG. 4A, in the embodiment, the center of the lateral through hole 15 is slightly lower than the surface of the first annular platform 14, so the semicircular groove of the first engaging structure 13 is slightly shallower than the semicircle. Accordingly, the tightness of the engagement of the two engaging structures can be improved in accordance with the height of a second engaging structure 23. In the embodiment, the central angle A between the two sides of the first engaging structure 13 and the center of the curved surface is less than 150 degrees, so the semicircle is not a perfect semicircle.

As shown in FIG. 2A and FIG. 2B, in the embodiment, four first engaging structures 13 at equal angular intervals are disposed on the first annular platform 14. However, when required, the quantity can be increased or decreased at will according to requirements, and the disclosure is not limited thereto. Moreover, a first connecting hole 16 is disposed on the side wall of the first shaft 10 for the pin 30 to pass through. On the other hand, multiple screw holes 18 of different depths are disposed on a lower annular end surface 17 on the bottom side of the first lower tube 12 for screws penetrating the housing 50 or the base 60 for fixing.

Figure 3A:
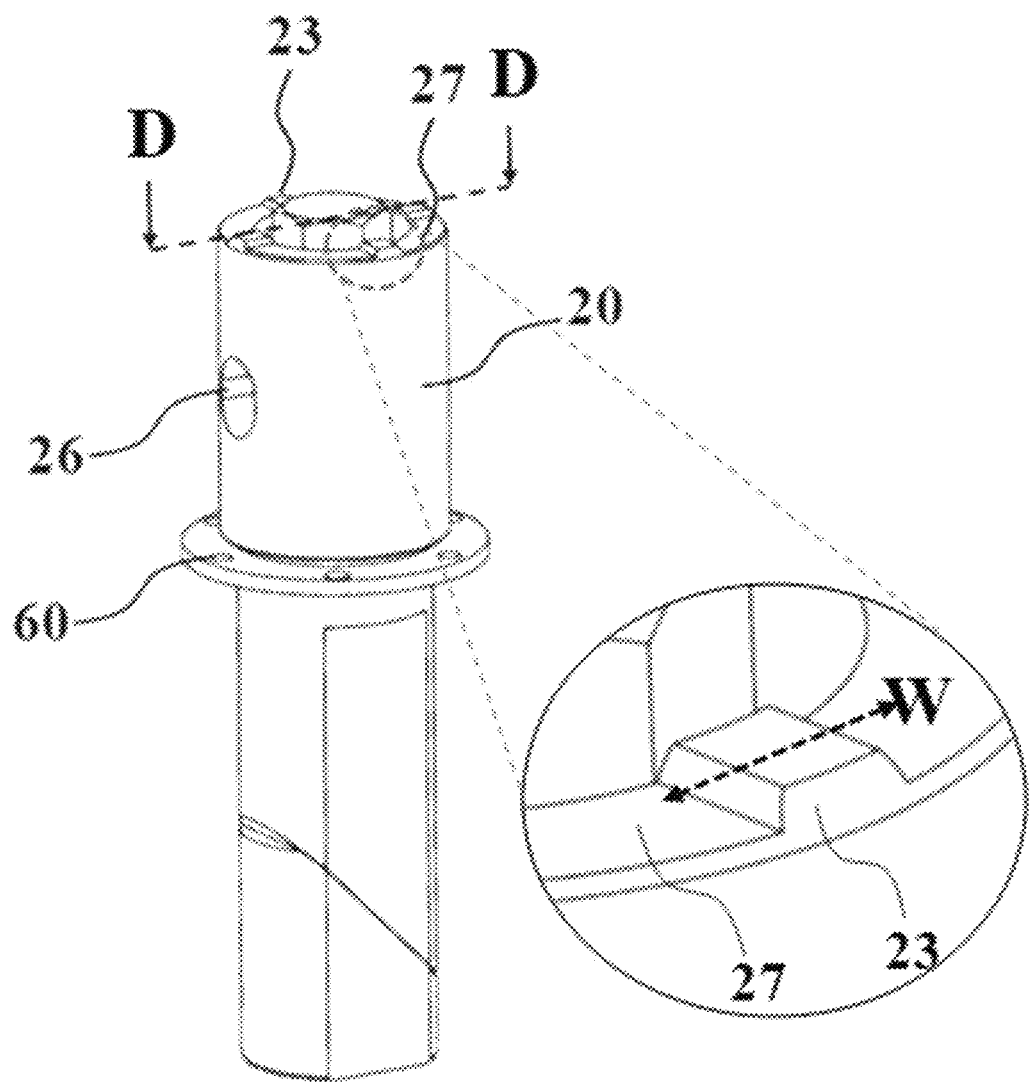
FIG. 3A is a three-dimensional schematic view of the second shaft and the base of the lock.
Figure 3B:
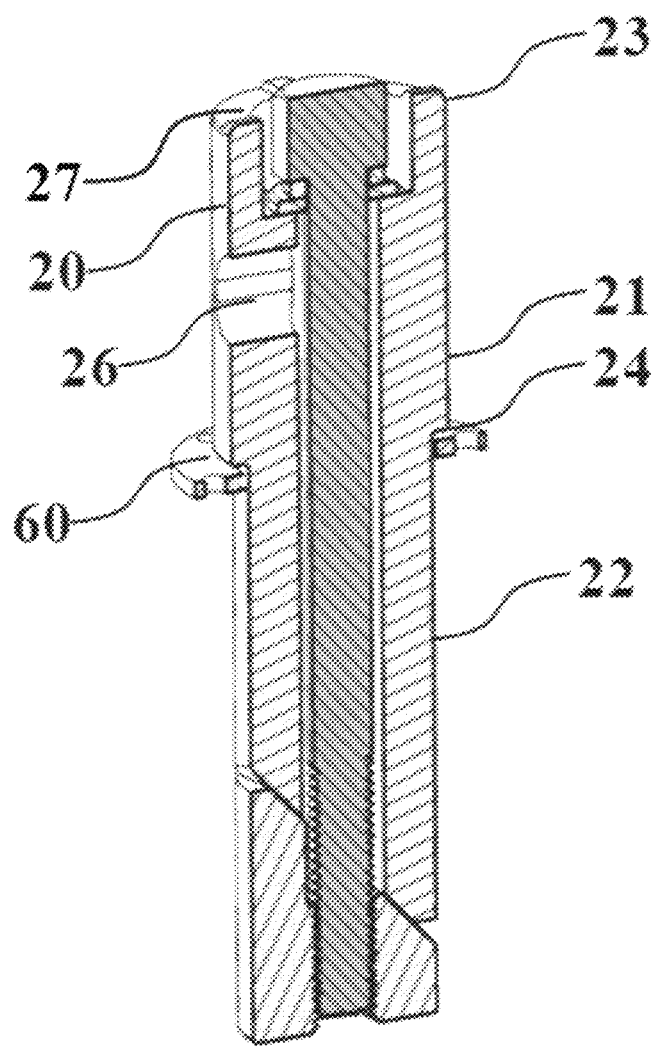
FIG. 3B is a schematic cross-sectional view of the second shaft and the base of the lock taken along the D-D reference line according to the first embodiment of the disclosure.

Referring to FIG. 3A to FIG. 3B, FIG. 3A is a three-dimensional schematic view illustrating the relative relationship of the second shaft 20 and the base 60 of the lock 1; FIG. 3B is a schematic cross-sectional view of the second shaft 20 and the base 60 of the lock 1 taken along the D-D reference line according to the first embodiment of the disclosure. For example, the second shaft 20 may selectively include a metal material (e.g., aluminum) and may be a one piece formed structure formed by a cutting process. The second shaft 20 may selectively be hollow-tube-shaped. The second shaft 20 includes a second upper tube 21 and a second lower tube 22. The outer diameter of the second upper tube 21 is greater than the outer diameter of the second lower tube 22, and a second annular platform 24 on the outer side wall of the second shaft 20 is disposed at the connection between the second upper tube 21 and the second lower tube 22. Moreover, at least one second engaging structure 23 disposed at equal angular intervals is disposed on an upper annular end surface 27 on the top side of the second upper tube 21.

Figure 4B:
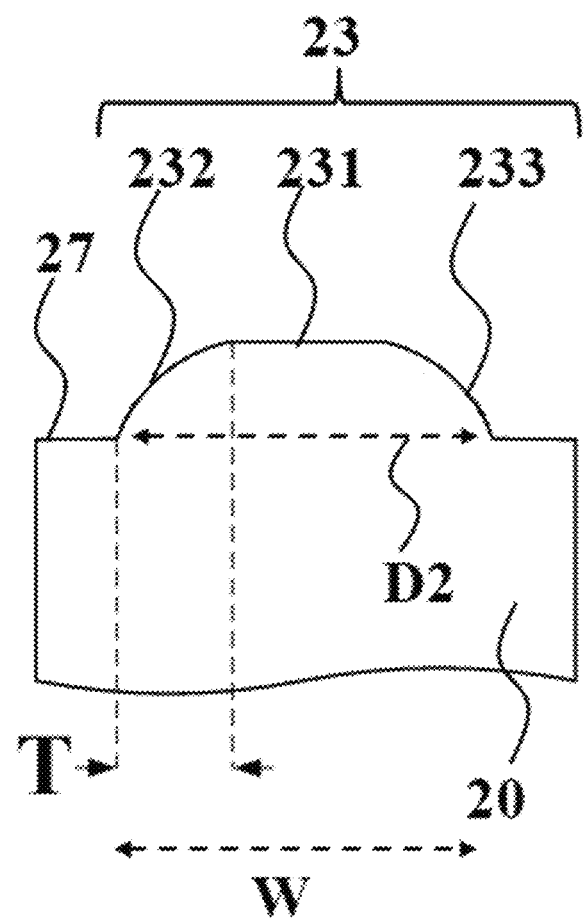

Referring to FIG. 3A, FIG. 3B, and FIG. 4B together, FIG. 4B is a schematic view of the side profile of the second engaging structure of the lock 1 according to the first embodiment of the disclosure. In the embodiment, each of the second engaging structures 23 is a protrusion equidistantly extending from the outer edge of the second shaft 20 to the axis on the upper annular end surface 27 on the top side of the second upper tube 21. When viewed from the outer edge of the second shaft 20 to its axis, each protrusion of the second engaging structure 23 in the width direction W includes a protruding platform 231 and a left inclined surface 232 and a right inclined surface 233 respectively disposed on the left and right sides thereof. In the embodiment, the left inclined surface 232 and the right inclined surface 233 respectively are curved surfaces, which are used to guide the corresponding cavities to be engaged together, but inclined surfaces can be a replaced implementation. The width direction W is substantially the same as the circumferential direction of the second shaft 20. On the other hand, as shown in FIG. 3A, a second connecting hole 26 is disposed on one side of the second shaft 20 for inserting the pin 30.

Figure 1D:
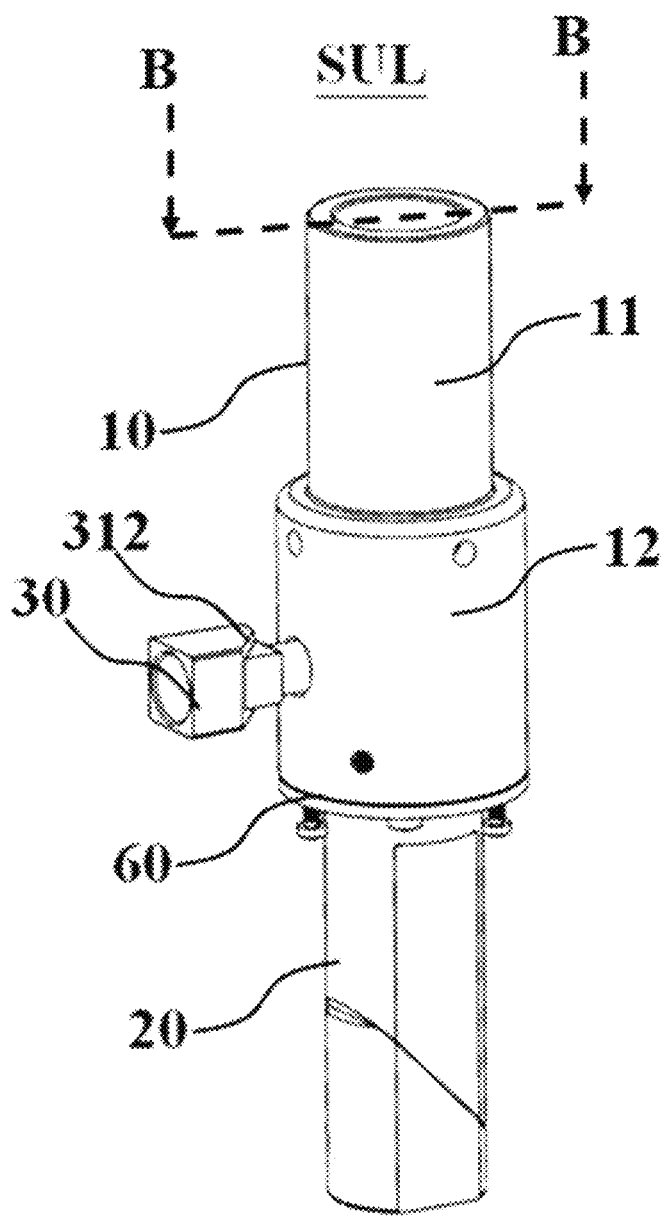
FIG. 1D is a three-dimensional schematic view illustrating the first shaft, the second shaft, and the base of the bike lock in the unlocking mode.
Figure 1E:
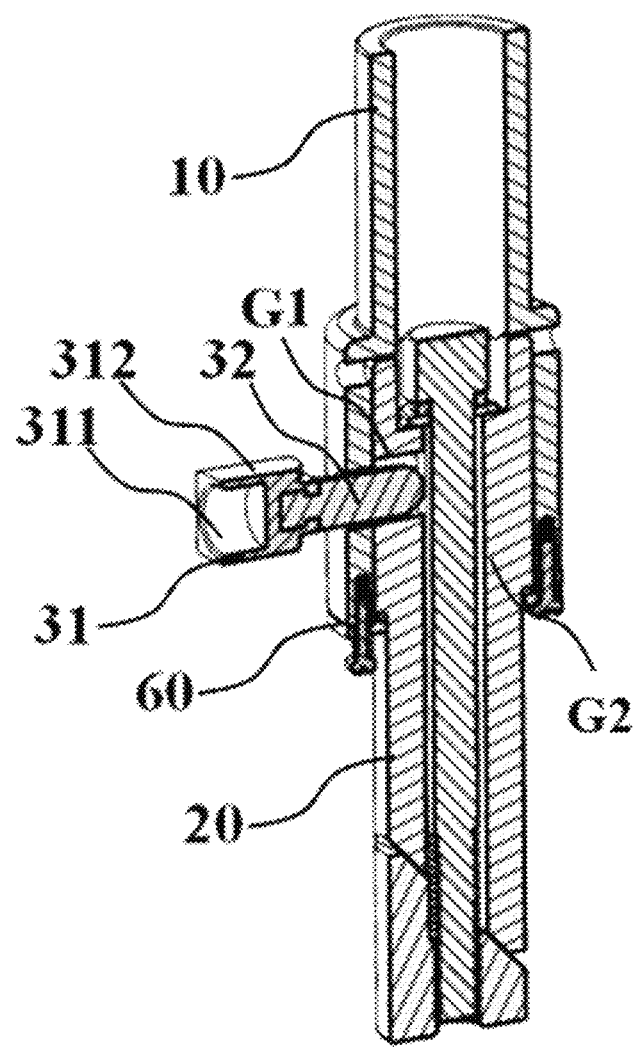
FIG. 1E is a schematic cross-sectional view illustrating the first shaft, the second shaft, and the base of the lock taken along the B-B reference line according to the first embodiment of the disclosure.

The pin 30 is used to link the first shaft 10 and the second shaft 20. Referring to FIG. 1D and FIG. 1E, FIG. 1D is a three-dimensional schematic view illustrating the first shaft, the second shaft, and the base of the lock 1 in the unlocking mode; FIG. 1E is a schematic cross-sectional view illustrating the first shaft, the second shaft, and the base of the lock 1 taken along the B-B reference line according to the first embodiment of the disclosure. According to drawings, the pin 30 includes a base 31 and a head portion 32. The head portion 32 is used to connect the first shaft 10 and the second shaft 20 and includes a curved surface with an increasingly smaller front end. An inclined surface 312 is disposed on the base 31, and the slope and the direction of the inclined surface 312 correspond to those of the inclined surface (not shown) in the hole of the pin 30 of the slider 70. An accommodating groove 311 is disposed on the base 31, which is recessed in the horizontal direction from the left end surface to the right end surface of the base 31 and is used for accommodating a part of the driving component 40. In the embodiment, the base 31 and the head portion 32 are two independent elements that are combined with each other. The base 31 may include a weaker plastic material to reduce weight, and the head portion 32 may include a metal material for strength requirements. However, the base 31 and the head portion 32 can also be different parts of a single element.

The driving component 40 can store and release mechanical energy or strain energy by compressing the fluid therein or by straining the material of the element itself. Specifically, for example, it can be either a machine or a device, such as a spring, a reed, or an air cylinder (e.g., an elastic device), or a combination thereof. In the embodiment, the driving component 40 is a spring, and its dimension corresponds to the dimension of the accommodating groove 311 of the base 31 of the pin 30 so that at least part of the driving component 40 can be embedded in the accommodating groove 311.

The housing 50 is used to wrap and fix at least a part of each element in the lock 1. Referring to FIG. 1C, multiple structures, such as ribs, protrusions, or lock holes that can restrict the travel direction of the elements are disposed inside the housing 50. Multiple through holes are disposed on the bottom of the housing 50, allowing screws to pass through the base 60 and to be fixedly locked on the lower annular end surface 17 of the bottom end of the first shaft 10 so that each of the elements can be fixed to each other.

In the embodiment, the base 60 is a circular metal sheet with an opening whose aperture has a diameter less than the outer diameter of the second upper tube 21 of the second shaft 20. When in use, the base 60 is screwed to the bottom of the first shaft 10 to restrict and obstruct the passage of the second shaft 20, so the effect of restricting the maximum relative displacement of the second shaft 20 relative to the first shaft 10 in the vertical direction can be achieved. Moreover, multiple through holes are disposed on the base 60 to allow screws to pass through.

The slider 70 is used to slide with one degree of freedom in the lock 1 and drive the inclined surface 312 of the base 31 of the pin 30 to enter and withdraw with its inclined surface structure to switch the locking mode and the unlocking mode of the lock 1.

Referring to FIG. 1A to FIG. 1C, the rope 100 is used to wind the bike and the lock 1 connected to the bike around a fixed object 2 to achieve a locking effect. One end of the rope 100 is connected to the lock rope turntable 90 in the body of the lock 1, and the other end is connected to the rope head 110. In the embodiment, the rope 100 can selectively be a steel rope. However, the lock 1 is not limited to the disposition of the rope 100. In another embodiment, when the rope 100 is not required to wrap the fixed object 2, the lock 1 can also selectively omit the related designs of the rope 100, the retraction button 52, and the lock rope turntable 90. In this design, the rope head 110 can be used as an independent element similar to a key for locking the lock 1. Moreover, the rope head 110 can also be designed as another button disposed on the outside of the housing 50. When pressed, the rope head 110 is pushed into the lock 1 and locked; when unlocked, the rope head 110 pops out, but it does not come off from the housing 50.

Note that, in the embodiment, during the locking process of the lock 1, no electricity is required at all, and the entire locking process is completed only by the force exerted by the user on the rope head 110. During the unlocking process, the power required by elements such as the control module 80 can be directly obtained from the unlocking device through the connection port 53. That is, with the design, the lock 1 may not include electric storage elements such as a battery or the like, and thereby the battery in the lock 1 is prevented from being damaged due to the open environment and failing to operate, so further the reliability of the lock 1 is further improved.

The operation mode of the lock 1 is illustrated in the following paragraphs.

Referring to FIG. 1C to FIG. 1E, before the activation of the locking process, the lock 1 is in the unlocking mode SUL, the top end of the second upper tube 21 of the second shaft 20 is embedded in the first lower tube 12 of the first shaft 10, and the first connecting hole 16 of the first shaft 10 and the second connecting hole 26 of the second shaft 20 overlap with each other. In the embodiment, when the user controls the handlebar to rotate the first shaft 10 through the stem, the first shaft 10 is linked with the second shaft 20 through at least one of the first transmission mechanism and the second transmission mechanism, thereby driving the front fork tube to drive the front wheel and to control the steering of the front wheel.

The first transmission mechanism refers to the use of the pin 30 to link the first shaft 10 and the second shaft 20. However, there is a gap G1 between each of the elements in either the vertical direction (Z-axis) or in the horizontal direction (X-axis), so swaying is prone to occur during operation. To tackle this, the second transmission mechanism is provided, and the first engaging structure 13 on the first shaft 10 and the second engaging structure 23 on the second shaft 20 are tightly engaged with each other, so the elements can be effectively transmitted.

In the embodiment, the first transmission mechanism refers to the use of the pin 30 to penetrate the first connecting hole 16 and be inserted into the second connecting hole 26. Therefore, when the first shaft 10 rotates, the pin 30 is driven to drive the second shaft 20 to rotate along its axis. In the embodiment, the driving component 40 is a spring, which is used to compress when locked and expand when unlocked to push the pin 30 into the first connecting hole 16 and the second connecting hole 26. However, due to the constraints of space, volume, and weight, the force that the drive component 40 can provide to the pin 30 is limited. Therefore, to ensure that the driving component 40 can smoothly enter or withdraw the first connecting hole 16 and the second connecting hole 26, clearance fit is adopted for the first connecting hole 16 and the second connecting hole 26 and the pin 30, respectively, which can be interpreted as the first connecting hole 16 and the second connecting hole 26 respectively are larger than the pin; that is, gaps G1 respectively are reserved between the pin 30 and the first connecting hole 16 and the second connecting hole 26, so it is ensured that the pin 30 can enter and withdraw smoothly.

When the user turns the stem to drive the first shaft 10, there is a gap G1 between the pin 30 relative to the first shaft 10 and the second shaft 20, so the first shaft 10 and the second shaft 20 may be idling for a certain distance to fill the stroke of the gap G1 before they can achieve linkage, which may cause the handlebar to shake and affect the riding experience of the user. In response to this problem, in addition to the first linkage mechanism, the disclosure further has a second linkage mechanism to overcome the influence of the gap G1 in the first linkage mechanism on the riding experience.

The second transmission mechanism refers to using the first engaging structure 13 of the first shaft 10 and the second engaging structure 23 of the second shaft 20 to directly contact and engage with each other, so when the first shaft 10 rotates, the force can be instantly transmitted to the second engaging structure 23 through the first engaging structure 13 to minimize the influence caused by the gap G1. In the design, the first engaging structure 13 and the second engaging structure 23 are a cavity and a protrusion, respectively. However, in actual application, the cavity and protrusion can be interchanged without affecting the actual operation. Furthermore, the internal and external relationship between the first shaft 10 and the second shaft 20 can also be adjusted as required. Moreover, the first shaft 10 and the second shaft 20 respectively are an upper shaft and a lower shaft, which can also be adjusted according to requirements, and the disclosure is not limited thereto.

Figure 4C:
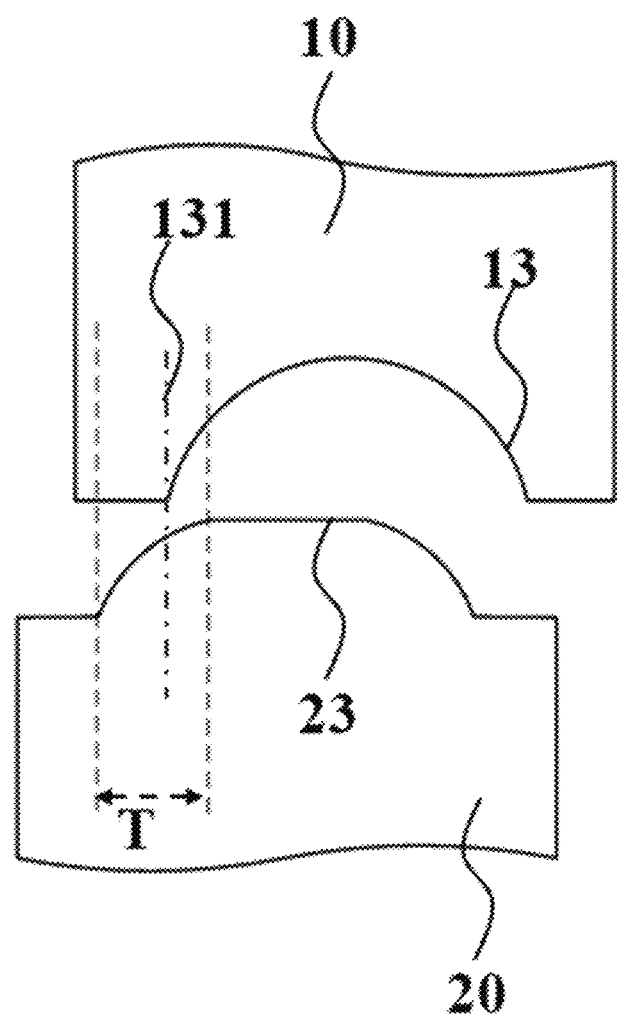

To ensure that in the locking mode SL, the first shaft 10 can freely rotate relative to the second shaft 20, and the user cannot effectively drive the front wheel by turning the handlebar, the maximum relative displacement of the first shaft 10 and the second shaft 20 in the vertical direction in the locking mode SL needs to be sufficient to allow the protrusion of the second shaft 20 completely comes off from the cavity of the first shaft 10, as shown in FIG. 4C. That is, the maximum relative displacement of the first shaft 10 and the second shaft 20 needs to be greater than the height of the protrusion of the second shaft 20 or the depth of the cavity of the first shaft 10, and meanwhile the first shaft 10 and the second shaft 20 are not too far away from each other.

To achieve the effect, in the embodiment, a base 60 is fixed at the lower annular end surface 17 of the first shaft 10 so that the second shaft 20 is restricted between the first shaft 10 and the base 60, further defining the maximum relative displacement of the first shaft 10 and the second shaft 20.

As can be seen from FIG. 1C, since the inner diameter of the inner opening of the base 60 is less than the outer diameter of the upper tube of the second shaft 20, when the user lifts the handlebar, the first shaft 10 may be lifted upwards, the base 60 fixed to the bottom of the first shaft 10 may also be lifted upwards, and after rising for a certain distance, the base 60 resists the second annular platform 24 of the second shaft 20. Meanwhile, the distance of a gap G2 between the base 60 and the second annular platform 24 of the second shaft 20 is less than the distance of the gap G1. Therefore, regardless of the locking mode SL or the unlocking mode SUL, the maximum relative displacement of the first shaft 10 and the second shaft 20 in the vertical direction is controlled by the distance of the gap G2 between the base 60 and the second annular platform 24 of the second shaft 20 in the vertical direction.

On the other hand, in the locking mode SL, the first shaft 10 can freely rotate relative to the second shaft 20, and in the unlocking mode SUL, after vertically separated from the second shaft 20, the first shaft 10 can still rotate along its axis, but its maximum rotation is limited by the distance of the gap G1 between the pin 30 and the first shaft 10 and the second shaft 20. In the embodiment, the maximum vertical distances of the first connecting hole 16 of the first shaft 10 and the second connecting hole 26 of the second shaft 20 are 8 mm respectively; the maximum horizontal distances are 7.97 mm; the maximum diameter of the cylinder at the front end of the pin 30 is about 7.94 mm. At this time, the width of the gap G1 in the horizontal direction and the width of the gap G1 in the vertical direction is 0.03 mm and relatively larger 0.06 mm, respectively.

Moreover, referring to FIG. 4C, when the half-width T of the protrusion of the second engaging structure 23 is designed to be greater than the maximum amplitude of the axial rotation of the first shaft 10 relative to the second shaft 20, this can ensure that an edge 131 of the first engaging structure 13 continuously corresponds to the curved or inclined surface of the second engaging structure 23, so that the first engaging structure 13 and the second engaging structure 23 can be automatically aligned when they approach to each other vertically. Referring to FIG. 4B, the half-width T in the disclosure is defined as when the first engaging structure 13 and the second engaging structure 23 are connected, a length of a structure in the protrusion of the second engaging structure 23 that can assist the edge 131 of the cavity of the first engaging structure 13 to guide the structure in the same direction along the width direction W. In the embodiment, the length of the protrusion in the width direction W is substantially equal to the length of the protrusion in the tangential direction of the circumference of the second shaft 20. For example, if the second engaging structure 23 is a trapezoidal structure with a narrow top and a wide bottom, the lengths of the left inclined surface 232 and the right inclined surface 233 in the width direction W respectively are the half-width T. If the protrusion of the second engaging structure 23 is a complete circular curved surface, the half-width T can be interpreted as half of the length of the entire circular curved surface in the width direction W.

Figure 4D:
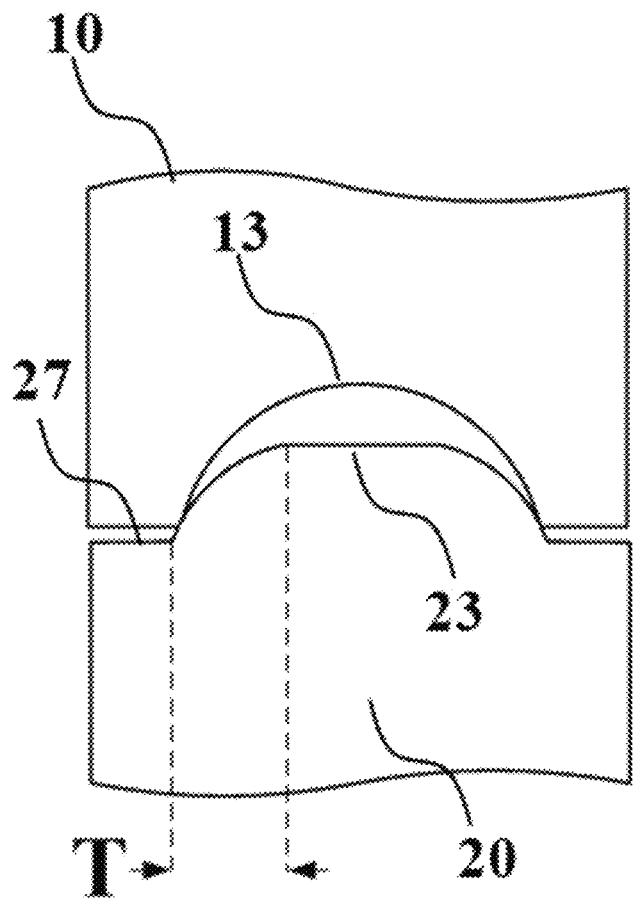
FIG. 4D and FIG. 4E are schematic views of a preferred design and a next preferred design of the first engaging structure and the second engaging structure of the lock according to the first embodiment of the disclosure.
Figure 4E:
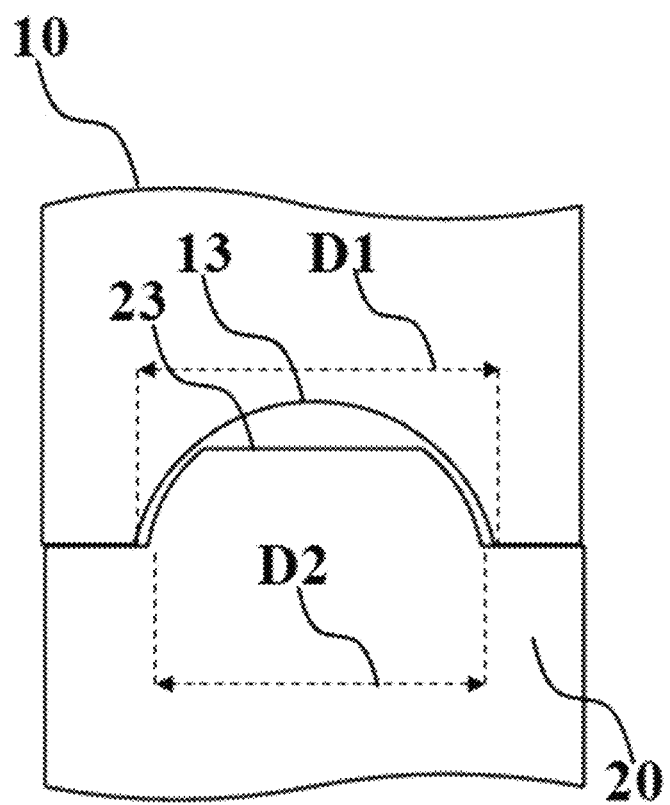

On the other hand, to ensure that the first engaging structure 13 and the second engaging structure 23 can be closely fit, it should be ensured that the maximum width D2 of the protrusion in the width direction W is close to or greater than the maximum width D1 of the opening of the cavity. That is, at least a transition fit or preferably an interference fit is adopted for both. Referring to FIG. 4D and FIG. 4E, FIG. 4D and FIG. 4E are schematic views of a preferred design and a next preferred design of the first engaging structure 13 and the second engaging structure 23 of the lock 1 according to the first embodiment of the disclosure. First, referring to FIG. 4A and FIG. 4B, the maximum width of the opening of the cavity of the first engaging structure 13 is D1; the maximum width of the protrusion of the second engaging structure 23 is D2; and as shown in FIG. 4E, the maximum width D1 is greater than the maximum width D2. That is, when $D1/D2 \geq 1$, a gap may be formed between the first engaging structure 13 and the second engaging structure 23, and the effect of reducing swaying is less obvious. On the contrary, if the design of FIG. 4D is adopted, the maximum width D1 is less than the maximum width D2, that is, $D1/D2 \leq 1$, and the protrusion and the cavity can be more closely fit to have a better linkage effect, which can effectively solve the swaying problem. In the embodiment, the value of D1 is about 3.87 mm, and the value of D1/D2 is about 0.987, which is less than 1. That is, when the difference of the maximum width D1 minus the maximum width D2 is less than the length of the gap G1 in the horizontal direction, or the maximum width D1 is less than the maximum width D2, the first engaging structure 13 and the second engaging structure 23 are tightly fit.

When the lock 1 is switched from the unlocking mode to the locking mode SL, the slider 70 may be automatically moved from the locked position to the unlocked position, and the driving component 40 pulls the pin 30 out of at least one of the first connecting hole 16 and the second connecting hole 26 so that the first shaft 10 and the second shaft 20 can freely rotate axially with each other and the two cannot be effectively linked.

Based on the above, one of the objectives of the disclosure is to provide a lock 1 in which the first shaft 10 and the second shaft 20 are linked when unlocked, and vice versa. Meanwhile, the lock 1 is equipped with two linkage mechanisms. One is to link the first shaft 10 and the second shaft 20 with a pin 30, and the other is using the first engaging structure 13 on the first shaft 10 and the second engaging structure 23 on the second shaft 20 to tightly engage the two shafts. Therefore, in the disclosure, the first shaft 10 and the second shaft 20 can be tightly linked, and this solves the swaying problem of the pin 30 and the first shaft 10 and the second shaft 20 caused by the gap, which affects the user experience. Moreover, in the disclosure, the first shaft 10 and the second shaft 20 of the lock 1 are respectively fixed, locked, and linked to the stem of the bike and the front fork tube, so the lock 1 of the disclosure can be easily installed without destructive modification of the bike.

Finally, it is emphasized that the equal scope of the lock 1 of the disclosure includes but is not limited to the implementation of the embodiments, the constituent elements and steps disclosed in the previously disclosed embodiments of the disclosure are only examples for illustration and are not used to limit the scope of the disclosure, the substitution or modification of other equivalent elements and steps shall also be covered by the scope of patent application of the disclosure.

What is claimed is:

1. A bike lock, comprising:
a first shaft comprising a first connecting hole and a first engaging structure, wherein the first shaft is adapted to link to an element of a bike;
a second shaft comprising a second connecting hole and a second engaging structure, wherein the second shaft is adapted to link to another element of the bike; and
a pin adapted to limit actions of the first shaft and the second shaft;
wherein the bike lock comprises a locking mode and an unlocking mode, and in the unlocking mode, the first shaft is linked to the second shaft by a first linkage mechanism or a second linkage mechanism;
in the first linkage mechanism, the pin is inserted into the first connecting hole of the first shaft and the second connecting hole of the second shaft, so the first shaft and the second shaft are linked to each other, and clearance fit is adopted for the first connecting hole and the second connecting hole with the pin, respectively;
the second linkage mechanism engages the first engaging structure of the first shaft with the second engaging structure of the second shaft, so the first shaft and the second shaft are linked to each other, and the first engaging structure is closely fit with the second engaging structure.

2. The bike lock of claim 1, further comprising a driving component linked to the pin, wherein the driving component is adapted to drive the pin to be inserted into the first shaft and the second shaft when the bike lock is switched from the locking mode to the unlocking mode.

3. The bike lock of claim 1, further comprising a housing for accommodating at least a part of the first shaft, the second shaft, and the pin, respectively, wherein when the bike lock is in the unlocking mode, one of the first shaft and the second shaft is fixed to the housing, and the other is movable relative to the housing.

4. The bike lock of claim 3, further comprising a base, wherein the base is fixed in the housing, and the base is adapted to fix the first shaft and the housing to each other and limit a maximum relative displacement of the second shaft relative to the first shaft in the vertical direction.

5. The bike lock of claim 1, wherein the first shaft comprises an upper vertical through hole and a lower vertical through hole, the upper vertical through hole and the lower vertical through hole are disposed coaxially, an aperture of the lower vertical through hole is greater than an aperture of the upper vertical through hole, a first annular platform is disposed at a junction between the lower vertical through hole and the upper vertical through hole of the first shaft, the first engaging structure is located on the first annular platform, a top side of the second shaft comprises an upper annular end surface, and the second engaging structure is located on the upper annular end surface.

6. The bike lock of claim 5, wherein the first engaging structure is a groove-shaped cavity extending toward an axis of the first shaft, the second engaging structure is a protrusion extending toward an axis of the second shaft, and the protrusion comprises an inclined surface or a curved surface.

7. The bike lock of claim 6, wherein the groove-shaped cavity is disposed on the first annular platform, the groove-shaped cavity is a circular curved surface structure, the protrusion is disposed on the upper annular end surface, and the protrusion is a circular curved structure or a trapezoidal structure with a narrow top and a wide bottom.

8. The bike lock of claim 6, wherein when the bike lock is in the unlocking mode, relative to the first shaft, the second shaft rotates axially along the axis of the second shaft and moves in a vertical direction within a limited range.

9. The bike lock of claim 8, wherein a maximum amplitude of the axial rotation in the unlocking mode is less than the half width of the second engaging structure, so the first shaft and the second shaft are automatically aligned and engaged along the inclined surface or the curved surface of the second engaging structure.

10. The bike lock of claim 6, wherein when the bike lock is in the locking mode, a maximum relative displacement of the first shaft and the second shaft in the vertical direction is greater than a height of the protrusion of the second engaging structure, so the first shaft freely rotates axially relative to the second shaft.

* * * * *